UNITED STATES PATENT OFFICE.

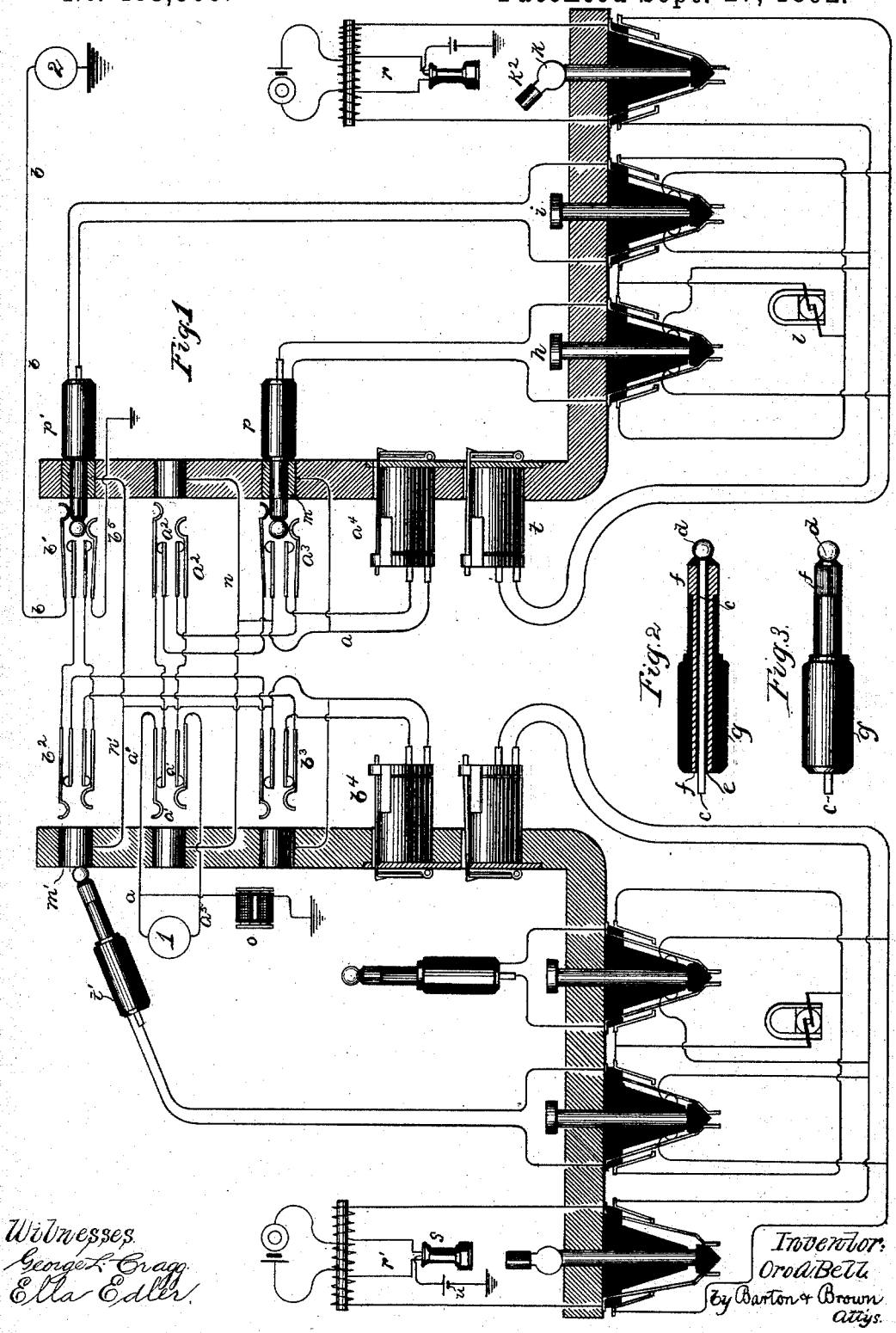

ORO A. BELL, OF NEW YORK, N. Y., ASSIGNOR TO THE WESTERN ELECTRIC COMPANY, OF CHICAGO, ILLINOIS.

TEST SYSTEM FOR MULTIPLE SWITCHBOARDS.

SPECIFICATION forming part of Letters Patent No. 483,506, dated September 27, 1892.

Application filed September 30, 1891. Serial No. 407,262. (No model.)

*To all whom it may concern:*

Be it known that I, ORO A. BELL, a citizen of the United States, residing at New York, in the county of New York and State of New York, have invented a certain new and useful Improvement in Test Systems for Multiple Switchboards, (Case No. 4,) of which the following is a full, clear, concise, and exact description, reference being had to the accompanying drawings, forming a part of this specification.

My invention relates to test systems for multiple switchboards of telephone-exchanges. Its object is to provide a test system such that a test-signal shall be a certain indication as to the condition of the line tested.

Heretofore it has been common to connect all the test rings or frames of the spring-jacks together and to one of the line-wires, and to so arrange the connections of the test system that the conductor joining the frames of the several spring-jacks should be included as a portion of the test-circuit; but in the employment of this system induced current flowing in the lines tested or static discharges from the lines frequently produced false test-signals. Thus the testing-operator was misled as to the actual condition of the lines tested. My invention is designed to obviate this difficulty.

In my invention I employ line spring-jacks having two line-springs and contact-anvils and the usual test-rings. The line-circuits extend through the line-springs and contact-anvils of the several spring-jacks in the usual manner, and an individual annunciator is "bridged in" between the two sides of the line-circuit after they have included all their respective contact springs and anvils. The test rings or frames are electrically connected together. They are insulated from the line-springs of all the line-jacks; but at the answering-jack a branch from the conductor joining the test-rings extends to one side of the line-circuit, also, after it has extended through all its line-springs and contact-anvils. At some point external to the switchboard a branch connection is established to earth from that line to which the test-rings are connected. When the circuit is a grounded circuit, the normal ground may serve this purpose; but when the circuit is metallic an earth connection is made, as stated, preferably through a retardation-coil, to prevent the crossing of several lines together through their earth connections.

The connecting-plugs are of special construction, adapted for use with my improved testing system. The center of the coil of the testing-operator's telephone is connected through a test-battery to earth. The operator performs the operation of testing in the usual manner—viz., by connecting her telephone to a pair of cords and applying the tip of one of the terminal plugs to the test-ring of the line to be tested.

It will be seen that if the operator tests a line which is not in use a current will flow from her test-battery through one-half of her telephone-coil, through the cord and test-plug to the test-ring touched, thence to the test-ring of the answering-jack of that line, thence through one of the line-wires to earth, and a sharp click will be produced in the operator's telephone; but if the line tested were in use no current would flow from the test-battery, since the test-circuit would be open at the point of separation of the line-spring from its contact-anvil at that spring-jack at which a connection already existed. Thus a response from her telephone indicates to an operator testing that the line is idle, while the absence of a response indicates that the line is already in use.

My invention is illustrated in the accompanying drawings.

In Figure 1 of the drawings I have shown two sub-stations 1 and 2 connected to their respective spring-jacks and annunciators upon two sections of multiple switchboards. The switchboards are shown equipped with the usual keyboard circuits and apparatus and are provided with my improved testing-circuit. Fig. 2 is a longitudinal sectional view of one of the connecting-plugs. Fig. 3 is an elevation of the same.

Referring to Fig. 1, the sub-station 1 is shown connected to the exchange by lines forming a metallic circuit. The circuit may be traced from station 1 over line $a$ to jack $a'$ at the first section of switchboard through one line-spring and its contact-anvil, thence similarly through line-jack $a^2$ through answering-jack $a^3$, thence through individual annunciator $a^4$, thence returning through the other line-springs and contact-anvils of the answering-jack $a^3$ and line-jacks $a^2$ and $a'$, and thence returning by line $a^5$ to station 1. The circuit from station 2 is shown as grounded. It may be traced over line $b$ through one line-spring and contact-anvil of line-jacks $b'$ $b^2$, answering-jack $b^3$ to annunciator $b^4$, and thence returning through the remaining line-springs and anvils of jacks $b^3$ $b^2$ $b'$ through earth to station 2. The operator's outfit is shown complete at both boards. That at one board comprises two connecting-plugs $p$ $p'$, constructed in accordance with my invention, conductors joining corresponding contact-pieces of the plugs, keys $h$ and $i$, and a source of electricity $l$ for calling either subscriber, and a key $k$ for connecting the operator's telephone-set $r$ to the subscriber's circuit.

Referring to Figs. 2 and 3 it will be seen that the connecting-plug consists of a central core $c$, terminating at one end in a spherical tip $d$. The core $c$ is surrounded by an insulator $e$. Outside of this sleeve is a metallic sleeve $f$, expanded for a small portion of its length to a greater diameter. This sleeve is also surrounded by an insulating-sleeve $g$, a portion of which is of the same diameter as the enlarged portion of the metallic sleeve. The tip $d$ is adapted to make contact with one of the line-springs of the spring-jack and raise it from its contact-anvil. The enlarged portion of the sleeve $f$ is adapted to make contact with the remaining line-spring and to separate it from its anvil. The insulating-sleeve $g$ prevents contact between the sleeve $f$ and the test-ring of a spring-jack. The calling-key $h$ or $i$ is adapted to disconnect both contact-pieces of one connecting-plug from those of the other and to connect them with the two poles of a calling-generator $l$ when depressed. The listening-key $k$ is provided with springs and contact-pieces, whereby when the cam $k^2$ is thrown into the vertical position, as shown at the first section of the switchboard at the left of the drawings the operator's telephone-set is bridged in between the conductor joining the two plugs, and hence between the two sides of a circuit established between two subscribers, by means of these connecting-plugs. A clearing-out annunciator $t$ is permanently bridged in between the conductors joining the two plugs in the well-known manner. The operation of exchange system—such as that shown—is well known and need be but briefly described.

When a subscriber, say, at sub-station 1 desires to communicate with another, as at station 2, he sends a call-signal by rotating his generator over line $a$ $a^5$. The shutter of annunciator $a^4$ is thrown down. The operator inserts one connecting-plug $p$ into answering-jack $a^3$ and throws the lever of her listening-key $k$ into its vertical position, thereby extending the circuit from sub-station 1 through the two line-springs of jack $a^3$, the tip and sleeve, respectively, of plug $p$, the springs and contact-anvils of listening-key $k$, through her telephone-set $r$. She is therefore now in communication with sub-station 1. Having learned with what line connection is desired, she proceeds to test the line called for to determine whether it is already in use or not at some other board. This process I will for the present pass by, preferring to describe it more in detail later. Assume, however, that she finds the line not to be in use. She inserts the other plug $p'$ of the pair into the jack $b'$ of the line to station 2 at her board. Thus the circuit is also extended from station 1 through the conductors joining plugs $p$ $p'$ to the line-spring of line-jack $b'$, and thence to station 2. The operator's telephone-set $r$ remains in a branch connection between the two sides of the circuit so formed, so that the operator may communicate with the subscriber at either station. Having determined that the second subscriber has responded, the operator disconnects her telephone by throwing the lever of key $k$ into its inclined position. When conversation is finished, either of these subscribers sends a clearing-out signal by rotating his generator, and thus causes the shutter of the clearing-out annunciator $t$ to fall. This is a signal to the operator that the connection between the two may be broken.

The test system in which my invention particularly consists is as follows: Each of the spring-jacks of a subscriber's line is provided with a "test-ring," as $m$ of jack $a^3$, insulated from the line-springs and contact-anvils of the jacks. All the test-rings of one line are connected together by a conductor, as $n$, and a branch is extended from the conductor joining them to one of the lines, as $a$, after it has included the line-spring and contact of the answering-jack, as $a^3$. At some point outside the exchange—that is, before the line, as $a$, has included the first spring-jack, as $a'$—a permanent connection is established from the line, as $a$, to earth. When the circuit is a grounded line, as line 2, the ground of the circuit serves as this earth connection; but when the circuit is metallic an earth connection is made, as stated, preferably through a retardation-coil, as $o$, to prevent the crossing of lines together. A branch is extended from the middle of the coil of the operator's telephone to earth, including a testing-battery.

I have stated that when an operator—say at the first board—is called upon to make a connection to a line she first proceeds to test the line to determine whether it is already in use or not. This she does by applying the tip of one of her connecting-plugs, as $t'$, to the test-ring of the jack at the board of the line called for—as, for example, to $m'$ of line from station 2. If the line is not in use, a current flows from her test-battery $u$ through one-half of her telephone, thence to the tip of test-plug $t'$, thence, in the case assumed, to the test-ring $m'$, thence over conductor $n'$ through the branch before described to line $b^5$, and thence to earth, returning to battery $u$. At each application of the test-plug $t'$ to the test-ring $a$ a click would be produced in her telephone $s$. If, however, the line tested is in use, as line to station 2 in the drawings, the test-circuit is open at the jack at which the connection already exists at the point of separation of the line-spring from its anvil, and no signal will be produced in the testing-operator's telephone. Thus it will be seen that induced currents or static charges on the lines cannot produce false signals, since when the line is in use the test-circuit is entirely separated from the telephone-circuit.

It is obvious that other forms of responsive device than the telephone $r$ might be employed to give an audible or a visual signal when traversed by the test-current. Hence I do not limit myself to this particular means of producing a signal. Moreover, I do not limit myself to the use of my invention in connection with any particular form of keyboard. It might readily be adapted to any of those in use by one skilled in the art.

Having thus described my invention, I claim as new and desire to secure by Letters Patent—

1. The combination, with spring-jacks, each having two line-springs, two contact-anvils, one for each line-spring, and a test-ring insulated from the line-spring, of two telephone-lines $a$ $a^5$, each of which includes one of the line-springs and its contact-anvil upon each of the jacks, a conductor joining all of said test-rings, a branch from said conductor to one of the lines after it has included all its respective line-springs and contacts, and an earth connection to that line to which the said branch extends, substantially in the manner and for the purpose specified.

2. The combination, with spring-jacks, each having two line-springs, two contact-anvils, one for each line-spring, and a test-ring insulated from the line-spring, of two telephone-lines $a$ $a^5$, extending from a telephone-station, each including one line-spring and its contact-anvil of each spring-jack, a conductor joining all the test-rings, an earth connection to one of the lines between the telephone-station and the first spring-jack, a branch connecting said conductor with the grounded line at the last jack, and a branch connection from one of said test-rings to earth, including a source of electricity and a responsive device, substantially as and for the purpose specified.

3. The combination, with a telephone-line, of spring-jacks having two line-springs and two back contacts, one line-spring and its back contact of each spring-jack being included in each side of the line-circuit, and test-pieces upon each spring-jack, connected to the line-circuit between the different back contacts of the last jack of the series, whereby said test-pieces are disconnected from the line-circuit when a plug is inserted into any jack, substantially as specified.

In witness whereof I hereunto subscribe my name this 21st day of July, A. D. 1891.

ORO A. BELL.

Witnesses:
FRANK R. MCBERTY,
JOHN O. PARSONS.